United States Patent
Moeller et al.

(10) Patent No.: US 11,919,507 B2
(45) Date of Patent: Mar. 5, 2024

(54) METHOD FOR CONTROLLING A MOTOR VEHICLE HAVING A PARK LOCK

(71) Applicant: VOLKSWAGEN AKTIENGESELLSCHAFT, Wolfsburg (DE)

(72) Inventors: Peter Moeller, Gross Twuelpstedt (DE); Stefan Samson, Braunschweig (DE); Stefan Ernst, Wolfsburg (DE); Raimar Warnecke, Gross Schwuelper (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 562 days.

(21) Appl. No.: 16/960,234

(22) PCT Filed: Dec. 21, 2018

(86) PCT No.: PCT/EP2018/086506
§ 371 (c)(1),
(2) Date: Jul. 6, 2020

(87) PCT Pub. No.: WO2019/134853
PCT Pub. Date: Jul. 11, 2019

(65) Prior Publication Data
US 2021/0061260 A1     Mar. 4, 2021

(30) Foreign Application Priority Data
Jan. 4, 2018   (DE) .............. 102018200092

(51) Int. Cl.
*B60W 30/00*   (2006.01)
*B60W 10/08*   (2006.01)
(Continued)

(52) U.S. Cl.
CPC ............ *B60W 30/00* (2013.01); *B60W 10/08* (2013.01); *B60W 10/10* (2013.01);
(Continued)

(58) Field of Classification Search
None
See application file for complete search history.

(56) References Cited

U.S. PATENT DOCUMENTS 6,718,513 B1 *   4/2004   Ryu .................. H04L 43/16
                                               370/242
9,188,224 B2    11/2015   Kapp et al.
(Continued)

FOREIGN PATENT DOCUMENTS

CN   102363417 A  *   2/2012
CN   103821928 A       5/2014
(Continued)

*Primary Examiner* — Adam R Mott
*Assistant Examiner* — Heather J Keniry
(74) *Attorney, Agent, or Firm* — Laurence A. Greenberg; Werner H. Stemer; Ralph E. Locher

(57) ABSTRACT

A method for controlling a motor vehicle having at least one park lock. A drive train of the motor vehicle has a drive motor, wheel, and a transmission. An operating element actuates the park lock, which can assume a blocking position, in which the park lock blocks the drive train and/or a part of the drive train, and a release position. After actuation of the operating element, the park lock is switched from the release position into the blocking position (or vice versa). Here, the speed of the motor vehicle is determined. After actuation of the operating element and if the park lock assumes the release position beforehand, it is checked whether the speed is greater than a predefined first threshold value. If this check was successful, a first warning signal is produced; and the switching of the park lock into the blocking position is performed.

11 Claims, 1 Drawing Sheet

(51) Int. Cl.
*B60W 10/10* (2012.01)
*B60W 10/18* (2012.01)
*B60W 50/14* (2020.01)
*F16H 57/01* (2012.01)
*F16H 61/12* (2010.01)
*F16H 63/34* (2006.01)
*F16H 63/48* (2006.01)

(52) U.S. Cl.
CPC .......... *B60W 10/182* (2013.01); *B60W 50/14* (2013.01); *F16H 57/01* (2013.01); *F16H 61/12* (2013.01); *F16H 63/3416* (2013.01); *F16H 63/483* (2013.01); *B60W 2510/188* (2013.01); *B60W 2520/10* (2013.01); *F16H 2061/1212* (2013.01); *F16H 2061/1216* (2013.01)

(56) References Cited

U.S. PATENT DOCUMENTS

| | | | | |
|---|---|---|---|---|
| 9,777,836 | B1 * | 10/2017 | Lee | F16H 3/66 |
| 2004/0061603 | A1 * | 4/2004 | Mack | F16D 48/06 340/453 |
| 2009/0227423 | A1 | 9/2009 | Bentner et al. | |
| 2017/0305403 | A1 * | 10/2017 | Maron | B60T 8/171 |
| 2018/0204393 | A1 * | 7/2018 | Landolsi | B60L 58/10 |

FOREIGN PATENT DOCUMENTS

| | | | | |
|---|---|---|---|---|
| CN | 103912680 A | 7/2014 | | |
| CN | 104590224 A | 5/2015 | | |
| DE | 102004039467 A1 | 2/2006 | | |
| DE | 102006061656 A1 | 7/2008 | | |
| DE | 102007005871 B3 * | 7/2008 | ........... | B60T 17/221 |
| DE | 102009015364 A1 | 11/2009 | | |
| DE | 102006061656 B4 * | 7/2011 | .......... | F16D 66/021 |
| DE | 10243276 B4 | 8/2013 | | |
| DE | 102013201393 A1 | 7/2014 | | |
| DE | 102013009747 A1 | 12/2014 | | |
| DE | 102013014746 A1 | 3/2015 | | |
| DE | 102013014746 A1 * | 3/2015 | ............. | F16H 61/12 |
| DE | 102013217973 A1 | 3/2015 | | |
| DE | 102013217973 A1 * | 3/2015 | ............. | B60T 13/04 |
| DE | 102015213611 A1 | 2/2017 | | |
| EP | 1970274 A2 * | 9/2008 | ............. | B60T 17/22 |
| JP | 2014119099 A | 6/2014 | | |
| JP | 2017171215 A * | 9/2017 | | |
| JP | 2017180725 A | 10/2017 | | |

* cited by examiner

METHOD FOR CONTROLLING A MOTOR VEHICLE HAVING A PARK LOCK

BACKGROUND OF THE INVENTION

Field of the Invention

The invention relates to a method for controlling a motor vehicle with at least one park lock. The motor vehicle has a powertrain. The powertrain has at least one drive motor, at least one wheel, in particular multiple wheels, and at least one gearbox. An operating element for actuating the park lock is provided and/or is present. The park lock can take up a blocking position, in which the park lock blocks the powertrain and/or part of the powertrain, and a release position in which the park lock releases the powertrain and/or or a part of the powertrain. After actuating the operating element the park lock is switched from the release position to the blocking position (or vice-versa).

For controlling a motor vehicle with a park lock, the powertrain of a motor vehicle has in particular multiple components, in particular a drive motor, at least one wheel, in particular multiple wheels, and at least one gearbox, wherein the corresponding components are operatively coupled and/or connected to each other to transfer a corresponding drive caused by the drive motor to the corresponding at least one wheel.

A conventional motor vehicle therefore has a drive motor, multiple wheels, a gearbox with a drive shaft, an output shaft, and a park lock, in particular for blocking the output shaft, as well as an operating element for the park lock. The drive shaft is coupled to the drive motor or can be coupled and/or operatively connected to it, the output shaft is coupled to at least one wheel or can be coupled and/or operatively connected to it, and the operating element is functionally technically directly or indirectly coupled to the park lock or operatively connected to it, in particular to a directly manually operated park lock.

The driver of the motor vehicle can engage the park lock by actuating the operating element, thus preventing the stationary vehicle from rolling away unintentionally. However, the driver may also engage the park lock while driving by actuating the operating element, in particular if the motor vehicle is rolling at only a very slow speed, thereby causing braking of the rolling motor vehicle. This is also referred to as "abusive actuation" of the park lock and leads to increased wear of the gearbox and/or the corresponding components.

DE 10 2013 009 747 A1 describes a motor car with a powertrain with a drivable axle, which is connected to an electric motor via a transmission device having a gearbox. The motor vehicle has a park lock, by means of which the transmission device can be blocked, as well as a parking brake by means of which the motor vehicle can be held stationary. The gearbox has a fixed gear which the park lock engages. The parking brake is a brake system that is redundant relative to the park lock. In the event of an impairment of the park lock, a warning signal can be sent to a person in the motor car. In the event of a malfunction of the park lock, the parking brake can be operated automatically. In this known motor vehicle, the warning signal is transmitted in the event of the impairment of the park lock and the parking brake is automatically actuated in the event of a malfunction of the park lock.

DE 102 43 276 B4 describes a method for controlling a selector lever lock to prevent abusive actuation of a park lock by moving a selector lever of an automatic transmission of a motor vehicle. The selector lever is connected to the park lock by a cable pull. The vehicle speed (v) of the vehicle is detected by a control unit with sensor assistance. The selector lever lock is activated to prevent the park lock from being engaged if the vehicle speed (v) is greater than a limit speed (vlim). The selector lever lock is deactivated to allow the park lock to be engaged if the vehicle speed is less than or equal to the limit speed (v≤vlim). Although this known method prevents the park lock from being engaged when driving too fast, i.e. if the motor vehicle is travelling faster than the limit speed, it does not prevent it at a slow speed, but allows the park lock to be engaged, i.e. if the motor vehicle is not driving faster or rather is driving slower than the limit speed.

DE 10 2006 061 656 A1 describes a method for estimating the wear condition of an electric parking brake, which is actuated by a control system to produce at least one dynamic braking process in a vehicle. A dynamic braking process is understood to be braking of the vehicle in motion, which exceeds a predetermined minimum speed of approx. 5 km/h, for example. The presence of a dynamic braking process is determined. Depending on this, a reference value giving the current wear condition of the electric parking brake is updated. The reference value is updated accordingly to estimate the wear condition, before, during or immediately after activation of an electronic parking brake. In order to determine the presence of a dynamic braking process, a first measuring signal dependent on the speed of the vehicle is generated and evaluated by the control system. From the generated first measurement signal, the individual measurement variable is derived, which is compared with an assigned first measuring threshold value, and an increased wear condition is detected when it is exceeded by the measurement variable. The number of dynamic braking processes is captured as an updated reference value, and the wear condition of the electric parking brake is estimated depending thereon.

The wear condition of the electric parking brake is indicated to the driver of the vehicle. The electric parking brake is provided in addition to a conventional service brake of the vehicle. Normally, the vehicle is dynamically braked by means of the service brake and static braking of the vehicle is performed by means of the electric parking brake. However, in specific defined driving situations or emergency situations, the electric parking brake may be used in addition to or alternatively to the dynamic braking of the vehicle. The electric parking brake has an electric motor-transmission unit for generating an actuating force. The actuating force is transferred from the electric motor-transmission unit to a brake mechanism unit, which is operatively connected to the electric motor-transmission unit via a cable pull system for this purpose. Depending on the actuating force applied to the brake mechanism unit, a braking force is produced by the brake mechanism unit, by means of which the at least one wheel of the vehicle is braked. This known method relates to the wear of an electric parking brake which brakes a wheel of the vehicle.

SUMMARY OF THE INVENTION

The invention is therefore based on the object of improving a method for controlling a motor vehicle having a park lock.

The object underlying the invention is achieved by a method for controlling a motor vehicle having at least one park lock as claimed. Advantageous embodiments of the invention are described in the dependent claims.

First, the speed of the vehicle is determined, wherein after actuating the operating element and if the park lock takes the release position beforehand, a check is carried out as to whether the speed is greater than a predetermined first threshold value, wherein if this check was successful, an initial warning signal is generated, wherein switching of the park lock into the blocking position is carried out.

The basic idea of the invention is first of all that using the park lock, when this is switched from the release position into the blocking position, the powertrain, and/or a part of the powertrain, in particular a component of the powertrain, is blocked. However, if there is a so-called "abusive actuation" by the driver, who manually actuated the operating element, when engaging the park lock in the blocking position, a first warning signal is generated. By means of this the driver is made aware of the "abusive actuation" of the park lock, in particular the driver is also warned to possibly take more care with his commands exerted by means of the operating element when inserting the park lock in the future. Thus, the attention of the driver is accordingly increased by the first warning signal.

Since the first warning signal is already generated by the first successful test (and not only as in the prior art with DE 10 2013 009 747 A1), in the event of an impairment of the park lock, the driver of the motor vehicle can be informed at an early stage that the actuation of the park lock is abusive in the case of a rolling vehicle and leads to increased wear of the park lock and/or the gearbox. In particular, wear can be delayed in this way.

The actuation of the operating element is carried out manually by the driver of the motor vehicle.

The operating element may be designed in any way as required, for example as a selector lever on a centre console of the motor vehicle or as a switch on a dashboard of the motor vehicle.

In the case of one embodiment, it is specified that a first indication on a combination instrument of the motor vehicle is triggered by the first warning signal for a predetermined time period.

The first indication may be designed in any way as required and may include, for example, an optical signal and/or an acoustic signal and/or the display of a text and/or icons.

In the case of one embodiment, it is specified that the first indication contains information relating to the abusive actuation of the park lock in a rolling motor vehicle, and/or information relating to the increased wear of the park lock and/or the gearbox.

In the case of one embodiment, it is specified that
if the speed test was successful,
  a counting variable is incremented;
  a check is carried out as to whether the counting variable is greater than a predetermined second threshold value;
  if this check was successful, a second warning signal is generated.
Thus, the counting variable represents the number of abusive actuations of the park lock. After repairing the park lock or gearbox or after installing a new park lock or a new gearbox, the counting variable is preferably reset to zero.

In the case of one embodiment, it is specified that the second warning signal triggers a second indication on a combination instrument of the motor vehicle for a predetermined time period.

The second indication may be designed in any way as required and may include, for example, an optical signal and/or an acoustic signal and/or the display of a text and/or icons.

In the case of one embodiment, it is specified that the second indication relates to information relating to reaching a maximum number of abusive actuations of the park lock in the case of a rolling motor vehicle, and/or information relating to the defect or failure of the park lock, and/or information relating to visiting a workshop and/or information relating to the use of a parking brake of the motor vehicle.

There are different options for suitably realizing the park lock in the powertrain of the motor vehicle. It is essential that the park lock is arranged and/or designed in such a way that the powertrain and/or part of the powertrain, in particular a component of the powertrain, is blocked in the blocking position of the park lock such that at least one wheel of the motor vehicle is blocked in order to prevent unintentional rolling away. In particular, the gearbox has a drive shaft, an output shaft, and/or an intermediate shaft, wherein the drive shaft is operatively coupled to the drive motor, and the output shaft is operatively coupled to at least one wheel. In particular, the park lock is then intended and/or designed for blocking the drive shaft, the output shaft, and/or the intermediate shaft of the gearbox.

The motor vehicle may preferably have an automatic or automated transmission. Advantageously, the motor vehicle may be a hybrid or electric vehicle, wherein its powertrain has at least one electric machine as a drive motor.

There are now a variety of possibilities for designing and developing the method according to the invention for controlling a motor vehicle having a park lock in an advantageous way. For this purpose, reference may first be made to the dependent claims. A preferred design of the invention can be explained below in more detail on the basis of the drawing and the accompanying description.

DETAILED DESCRIPTION OF THE INVENTION

Figure 1:
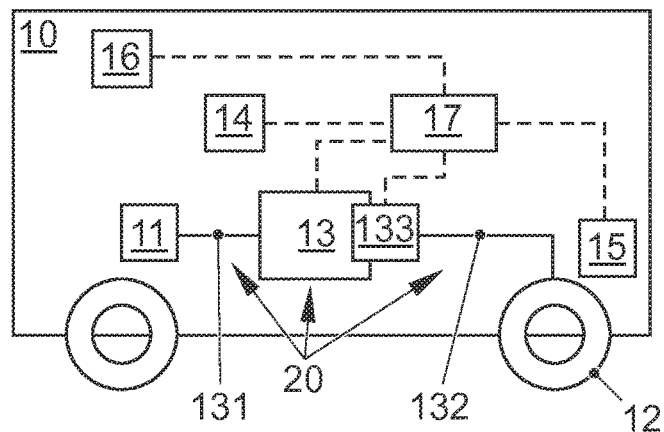
FIG. 1 shows a preferred embodiment of a motor vehicle, in particular a motor vehicle having a park lock.

In FIG. 1, a preferred embodiment of a motor vehicle 10, in particular a motor vehicle "10" having a park lock 133, is represented schematically.

The motor vehicle 10 has a powertrain 20, wherein the powertrain 20 has at least has a drive motor 11, at least one wheel 12, in particular multiple wheels, and at least one gearbox 13. For actuating the park lock 133, an operating element 14 is provided and/or present, wherein the park lock 133 is switchable into a blocking position or into a release position. In the blocking position of the park lock 133, the powertrain 20 and/or a part of the powertrain 20 or in particular one of the above-mentioned components is accordingly blocked in order to prevent unintentional rolling away of the motor vehicle 10. The design and/or implementation of a corresponding park lock 133, in particular the arrangement of the park lock 133 within the powertrain 20, can therefore be realized in multiple ways. A preferred embodiment of a motor vehicle 10 and/or the arrangement or design of a park lock 133 can be described below:

The motor vehicle 10 has a drive motor 11, at least one wheel 12, in particular multiple wheels, at least one gearbox 13, an operating element 14, a wheel revolution rate sensor 15, a combination instrument 16 and a control device 17.

The gearbox 13 has a drive shaft 131, an output shaft 132 and/or an intermediate shaft that is not shown and in particular the park lock 133, in particular for blocking the output shaft 132.

The drive motor 11 is coupled to the drive shaft 131 and can drive this, and the output shaft 132 is coupled to the at least one wheel 12 and can drive this.

The park lock 133 can take up a blocking position, in which in particular it blocks the output shaft 132, and a release position in which in particular it releases the output shaft 132. The operating element 14 is coupled to the control device 17 and/or to the park lock 133 and is designed in particular as a selector lever. In particular, the operating element 14 can be manually actuated by the driver of the motor vehicle 10 and/or is functionally operatively connected to the control device 17.

In particular, the park lock 133 is designed as a mechanically actuatable park lock 133. In this case, the operating element 14 can be in particular directly mechanically operatively connected to the park lock 133, in particular via a Bowden cable, or the park lock 133 can be actuated by the control device 17 (as a mechanically designed park lock 133) by actuators which are appropriately controlled by the control device 17 and which then mechanically actuate the park lock 133.

The control device 17 is coupled to the park lock 133, the operating element 14, the wheel revolution rate sensor 15 and to the combination instrument 16. The control device 17 is designed in such a way that it can determine the speed of the motor vehicle 10, in particular by means of the wheel revolution rate sensor 15, as well as the position of the park lock 133, and the park lock 133 can switch from the release position to the blocking (and vice versa), depending on the actuation of the operating element 14.

Figure 2:
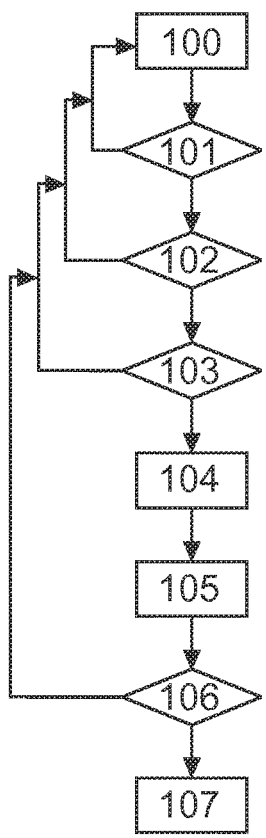
FIG. 2 shows a preferred embodiment of a method for controlling the motor vehicle of FIG. 1.

In FIG. 2 a preferred embodiment of a method for controlling the motor vehicle 10 is schematically presented. This method is carried out by the control device 17, for example.

In a step 100, the speed of the motor vehicle 10 is determined. For this purpose, the control device 17 assesses the measured values supplied by the revolution rate sensor 15 relating to the revolution rate of the wheel 12 in a known manner.

In a step 101, a check is carried out as to whether the operating element 14 has been actuated. For this purpose, the control device 17 assesses a state signal supplied by the operating element 14. If this check was successful, it jumps to step 102, otherwise it jumps to step 100.

In step 102 a check is carried out as to whether the park lock 133 takes up the release position. For this purpose, the control device 17 assesses a position signal supplied by the park lock 133. If this check was successful, it jumps to a step 103, otherwise it jumps to a step 100.

In step 103, a check is carried out as to whether the speed is greater than a predetermined first threshold value. For this purpose, the control device 17 reads the first threshold value from a memory and compares it with the determined speed. If this test was successful, it jumps to a step 104, otherwise it jumps to a step 100.

In step 104, a first warning signal is generated and sent to the combination instrument 16, which displays a first indication for a predetermined period containing information relating to the abusive actuation of the park lock 133 in a rolling motor vehicle 10, and information relating to the increased wear of the park lock 133.

In a step 105, the park lock 133 is switched to the blocking position. For this purpose, in particular, the control device 17 actuates the park lock 133 in such a way that the park lock 133 takes up the blocking position.

In a step 106, a counting variable is incremented, and a check is carried out as to whether the counting variable is greater than a predetermined second threshold value. For this purpose, the control device 17 reads the second threshold value from the memory and compares it with the counting variable. If this check was successful, it jumps to a step 107, otherwise it jumps to step 100.

In step 107, a second warning signal is generated and sent to the combination instrument 16, which, for a predetermined period, indicates a second indication containing information relating to reaching a maximum number of abusive actuations of the park lock 133 in the case of a rolling motor vehicle 10 and/or information relating to the failure of the park lock 133 and/or information relating to the visit to a workshop and/or information relating to the use of a motor vehicle 10 parking brake that is not shown.

REFERENCE CHARACTER LIST

10 Motor vehicle
11 Drive motor
12 Wheel
13 Gearbox
131/132/133 Drive shaft/output shaft/park lock
14 Selector lever, operating element
15 Wheel revolution rate sensor
16 Combination instrument
17 Control device
20 Powertrain

The invention claimed is:

1. A method of controlling a motor vehicle having at least one park lock,
wherein the motor vehicle has a powertrain with at least one drive motor, at least one wheel or multiple wheels, and at least one gearbox, wherein an operating element for actuating the park lock is provided and/or is present and the park lock assumes a blocking position, in which the park lock blocks the powertrain or a part of the powertrain, and a release position in which the park lock releases the powertrain or a part of the powertrain, and wherein, upon an actuation of the operating element, the park lock is switched from the release position to the blocking position or from the blocking position to the release position;
the method comprising:
determining a speed of the motor vehicle;
after an actuation of the operating element and when the park lock assumes the release position beforehand:
checking whether the speed of the motor vehicle is greater than a predetermined first threshold value;
determining that the checking step is positive and responsive to determining that the checking step is positive, generating a first warning signal;
switching the park lock into the blocking position and placing the park lock in the blocking position; and
responsive to determining that the checking step is positive:
incrementing a counting variable, checking whether the counting variable is greater than a predetermined second threshold value, and upon determining that the counting variable is greater than the predetermined second threshold value, generating a second warning signal.

2. The method according to claim 1, which comprises triggering with the first warning signal a first indication on a combination instrument of the motor vehicle for a predetermined time period.

3. The method according to claim 2, wherein the first indication includes information relating to an abusive actuation of the park lock in a case of a rolling car and/or information relating to an increased wear on the park lock.

4. The method according to claim 1, which comprises triggering with the second warning signal a second indication on a combination instrument of the motor vehicle for a predetermined time period.

5. The method according to claim 4, wherein the second indication concerns information selected from the group consisting of information relating to reaching a maximum number of abusive actuations of the park lock in a case of a rolling motor vehicle, information relating to a defect or failure of the park lock, information relating to a visit to a workshop, and information relating to a use of a parking brake of the motor vehicle.

6. The method according to claim 1, wherein the gearbox has a drive shaft and an output shaft, wherein the drive shaft is coupled to the drive motor and the output shaft is coupled to the wheel, and wherein the park lock is arranged for blocking a shaft selected from the group consisting of the drive shaft, the output shaft, and an intermediate shaft of the gearbox.

7. The method according to claim 1, wherein the park lock is a mechanically actuated park lock.

8. The method according to claim 7, wherein the operating element is functionally operatively coupled to a control device and the control device actuates mechanically actuatable components for switching the park lock.

9. The method according to claim 7, wherein the operating element is directly mechanically connected to a mechanism of the park lock for actuating the park lock.

10. The method according to claim 9, wherein the operating element is mechanically connected for actuating the park lock via a Bowden cable.

11. A method of controlling a motor vehicle having at least one park lock,
wherein the motor vehicle has a powertrain with at least one drive motor, at least one wheel or multiple wheels, and at least one gearbox, wherein an operating element for actuating the park lock is provided and/or is present and the park lock assumes a blocking position, in which the park lock blocks the powertrain or a part of the powertrain, and a release position in which the park lock releases the powertrain or a part of the powertrain, and wherein, upon an actuation of the operating element, the park lock is switched from the release position to the blocking position or from the blocking position to the release position;
the method comprising:
determining a speed of the motor vehicle;
after an actuation of the operating element and when the park lock assumes the release position beforehand:
checking whether the speed of the motor vehicle is greater than a predetermined first threshold value;
determining that the checking step is positive and responsive to determining that the checking step is positive, generating a first warning signal; and
switching the park lock into the blocking position and placing the park lock in the blocking position.

* * * * *